L. T. Blake,
Egg-Beater.
Nº 80,440        Patented July 28, 1868.
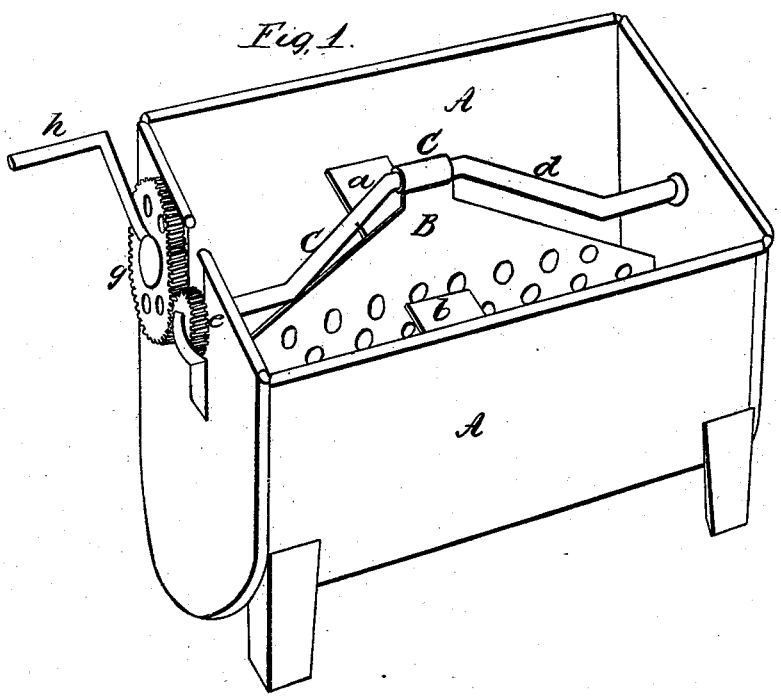
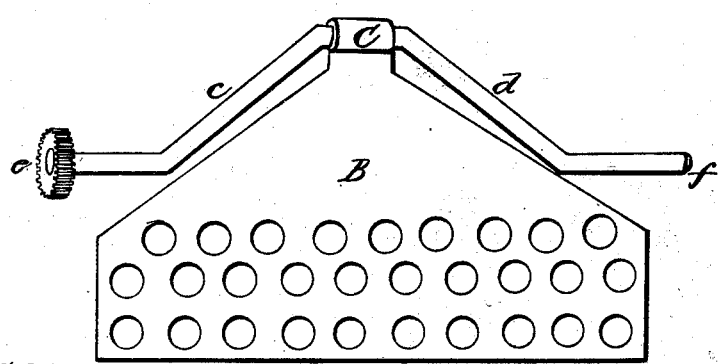
Witnesses:
Richard T. Lagow
Henry A. Knight
Inventor:
Lewis T. Blake,
by R. Fitzgerald
Atty

United States Patent Office.

LEWIS T. BLAKE, OF NEW HAVEN, CONNECTICUT.

*Letters Patent No. 80,440, dated July 28, 1868.*

IMPROVED EGG-BEATER.

*The Schedule referred to in these Letters Patent and making part of the same.*

TO ALL WHOM IT MAY CONCERN:

Be it known that I, LEWIS T. BLAKE, of the city and county of New Haven, in the State of Connecticut, have invented a new and useful Improvement in Egg-Beaters; and I do hereby declare that the following is a full, clear, and exact description of the construction, character, and operation of the same, reference being had to the accompanying drawings, which make part of this specification, in which—

Figure 1 is a perspective view of the whole apparatus, with the lid or cover removed, showing the beating-blade, which works internally, and the gearing which works it.

Figure 2 is a perspective view of the beating-blade, and the double crank which operates it.

My improvement consists in fitting a perforated sheet-metal beating-blade centrally in a suitable case, so that it may be operated by means of a double crank, worked by gear-wheels or other convenient contrivance, in such a manner as to give the beating-blade a lateral vibratory motion, to beat the eggs in the best and most expeditious manner, by the least labor.

I make the case or vessel of tinned iron, or any other suitable material, substantially in the shape or form shown at A A, fig. 1, that is, with a curvilinear bottom, so that it may be easily kept clean, and also to allow an easy reciprocating motion to the beating-blade B, (which, for many reasons, requires the same shape and space at the bottom as though it had a rotary motion.) And I fit two projections, one on each side, centrally, as shown at $a$ and $b$, to guide the beating-blade B in its vibrations.

I make the vibrating beating-blade of tinned iron or any other suitable material, substantially in the shape or form shown in fig. 2, and indicated at B, fig. 1, and I perforate it, as shown, so that the beating-blade may pass laterally through the mass of eggs, while portions of the eggs will pass through the perforations in the blade B.

I suspend this beating-blade B by the upper central part, on the central part of a double crank, as shown at C, figs. 1 and 2, and I secure the ends or journals of this double crank, $c$ and $d$, in proper bearings in the case A A, as shown at $e$ and $f$, at such a height that it will work freely in the case A A, and so that it may be easily taken out for cleaning, &c.

I work the double crank $c$ and $d$, and consequently the beating-blade, by means of a pinion, as shown at $e$, and a wheel, $g$, to which I fit a handle or crank, $h$, or by any other convenient means.

What I claim as my invention, and desire to secure by Letters Patent, is—

The combination of the case or vessel A A with the beating-blade B and double crank $c$ $d$, when the whole is constructed, arranged, and fitted for use substantially as herein described and set forth.

LEWIS T. BLAKE.

Witnesses:
LYMAN L. SQUIRE,
R. FITZGERALD.